United States Patent [19]

Mayer

[11] Patent Number: 4,668,071

[45] Date of Patent: May 26, 1987

[54] CHARACTER GENERATOR USING CATHODE RAY TUBE ACTIVATED LIQUID CRYSTAL DISPLAY

[75] Inventor: Edward F. Mayer, San Jose, Calif.

[73] Assignees: Ricoh Company, Ltd., Tokyo, Japan; Ricoh Systems, Inc., San Jose, Calif.

[21] Appl. No.: 588,129

[22] Filed: Mar. 9, 1984

[51] Int. Cl.[4] .................................. G03G 15/00
[52] U.S. Cl. ....................... 355/3 R; 355/1; 355/5; 350/331 R; 340/794
[58] Field of Search .......... 355/3 R, 71, 5, 11, 355/1, 40, 8; 346/153.1, 160, 5; 350/300, 302, 331 R; 340/794

[56] References Cited

U.S. PATENT DOCUMENTS

| | | | |
|---|---|---|---|
| 3,824,604 | 7/1974 | Stein | 355/40 X |
| 4,141,641 | 2/1979 | Nagai et al. | 355/1 |
| 4,297,022 | 10/1981 | Lester | 355/1 X |

Primary Examiner—A. C. Prescott
Attorney, Agent, or Firm—Flehr, Hohbach, Test, Albritton & Herbert

[57] ABSTRACT

A liquid crystal display is provided on the surface of a vidicon face plate. A number of conductive pins or electrodes connect to associated field effect transistors imbedded in the liquid crystal display for selectively energizing discrete areas in the liquid crystal display; the pins extend through the vidicon face plate. The electron beam of the vidicon is scanned sequentially across the terminals, and is turned on and off in accordance with stored binary data to impinge upon and selectively activate certain ones of the pins or electrodes, turning on the associated FET. After the full face of the vidicon has been scanned to form the desired pattern of activated FET's, a voltage is applied across the liquid crystal display. The area opposite each turned on FET will be appropriately polarized presenting a display on the outward facing surface of the display. This display is used to excite a photoconductive drum such as in an electrostatic photocopier to print a copy of the display data.

5 Claims, 3 Drawing Figures

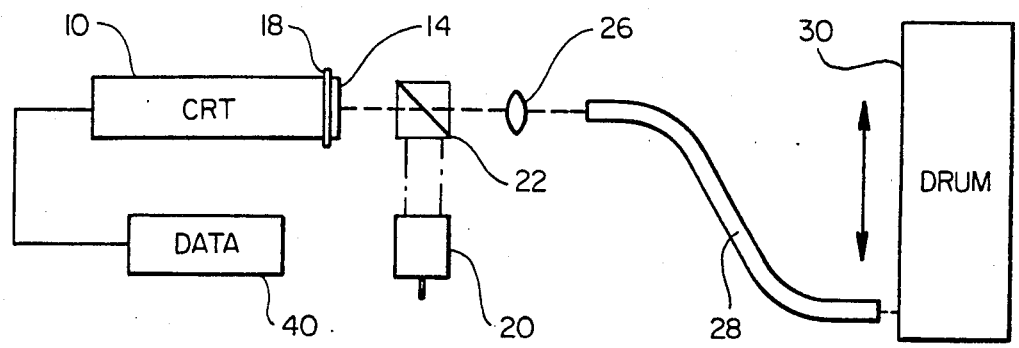
FIG_1
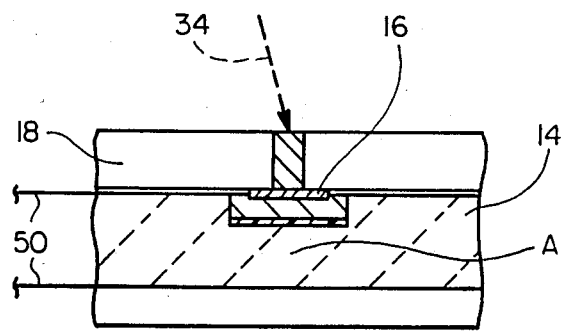
FIG_2A
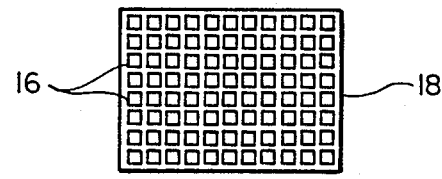
FIG_2B

CHARACTER GENERATOR USING CATHODE RAY TUBE ACTIVATED LIQUID CRYSTAL DISPLAY

The present invention relates generally to a high resolution high speed character generator and more particularly to a system for transferring binary data to a reuseable photoresponsive surface using a scanned liquid crystal display.

The present invention is especially suitable for use in electrophotographic copying apparatus in which electrically charged toner of one polarity is transferred from an oppositely charged electrostatic image on an outer surface of a photoconductive drum to the front side of a blank sheet for transforming the latter into an intended copy of the display on the surface of a liquid crystal display (LCD). Such apparatus typically includes a moveable photoconductive surface, the surface being movable through a fixed regularly repeating path of movement. As typically used, the apparatus produces copies from a given master or data source by forming an electrostatic image corresponding to the particular information to be copied on the photosensitive surface. Thereafter, the latent image is developed by means toner particles, specifically electrically charged heat fusible particles, which are applied to the image bearing surface in a specific way. Finally the applied toner particles are transferred from the drum to the blank sheet, thereafter fused thereon for transforming the sheet into a permanent copy.

The present invention is intended to modify the device described above in that the electrostatic latent image is not formed from a given optical master, but in response to a pattern of light and dark spots representing digital data, whereby the digital data may be converted to a visual image. As the light and dark spots are created representing the ones and zeros of binary data, a latent electrostatic image is created in a manner similar to an ink jet printer. This image can then be developed by the same general process outlined above, i.e. by applying toner to the light and dark areas as represented by the electrical charge patterns, utilizing electrophotographic apparatus as presently known.

It is therefore an object of the present invention to provide a improved system for converting binary data to a visual image.

It is a further object of the present invention to provide a means for providing a permanent record of stored binary data.

Another objective of the invention is to provide a simplified system for converting digital data to visual image, utilizing a system having a minimum number of mechanical parts required to operate at high speed. The above objectives and other advantages are achieved by providing a character generator for converting binary data to visible images including a cathode ray tube having a liquid crystal display on the face plate surface. A plurality of field effect transistors are provided on the rear portion of the liquid crystal display, each having a conductive pin or electrode extending through the face plate of the cathode ray tube (CRT). The CRT electron beam is scanned across the electrodes, and turned on and off to impinge upon and energize selected ones of the pins or electrodes, in accordance with the stored binary data. This turns on the associated FET. After the face of the CRT has been scanned to form a desired pattern of activated FET's corresponding to a bank of binary data, a voltage is applied across the LCD. The area opposite each turned on FET, will change polarization, presenting a display at the surface of the liquid crystal display. A bundle of fiber optic or other light transmissive devices are provided to convey the image on the surface of the liquid crystal display to a photoresponsive surface. By lighting the surface of the LCD using a light source synchronized with the energizing voltage applied to the liquid crystal display, the display excites a photoconductive drum, which can then be used to print a hard copy according to a known electrostatic process.

The present invention and the objects and features will be more readily apparent from the following detailed description and appended claims when taken with the drawings in which:

FIG. 1 is a functional block diagram of the elements of the character generator; and, FIG. 2 is a cross sectional view of a portion of the system which is used to selectively energize portions of the liquid crystal display.

The features and advantages of the present invention ca be understood more completely by reference to these figures wherein like numbers are applied to corresponding elements in the drawing. Referring to these drawings and especially to FIG. 1, the basic elements of the invention comprise a vidicon tube or CRT 10 having a face plate shown in greater detail in FIG. 2 and a liquid crystal display panel 14 on the tube surface. MOS switches define a rectangular array on the surface of the vidicon and shown in FIG. 2B. Each of the field effect transistors has a control electrode extending back through the face plate 18 of the vidicon. These switches, taken together, control the image to be displayed on the surface of the liquid crystal panel 14. The application of power to the array in turning on the display is effective to create a black and white image on the surface of the display in accordance with the charge applied to the electrodes by the electron beam.

This provides for a high resolution, relatively high speed character generation. For example, an array about one-half inch square maybe broken up into $10^4$ dots (100 by 100). Such a unit, allowing for time to scan the surface of the face plate and selectively energize each of the electrodes, allows for updating of the image 200 times per second. Between each updating of the image, power is applied to the liquid crystal display to form the image thereon, and a flash lamp 20 is energized which lights the LCD surface through a reflecting surface 22. The light image thereby formed is transferred through a lens 26 via a fiber optic scanning array 28 to the surface of a photoconductive drum 30. As a result, the image formed on the surface of the liquid crystal display 14 is imaged on the photoconductive drum surface 30, to be developed in accordance with known techniques.

The details are more readily apparent from FIG. 2A, wherein the liquid crystal display 14 is shown attached to the front surface of a vidicon face plate 18. A regular array of field effect transistors is provided throughout the entire liquid crystal display (see FIG. 2B). The closeness with which the field effect transistors 16 may be located is limited by solid state technology and the resolution of the beam 34, so that the beam will, when turned on selectively impinge on a single desired field effect transistor 16 at a time. Each field effect transistor is insulated from the adjacent field effect transistors.

The control terminals of all field effect transistors are led to the rear surface of the vidicon face plate 18. The beam 34 can be selectively deflected over the entire surface of the vidicon face plate using know and well developed technology. The beam can be turned on and off, once properly positioned, in accordance with data taken from the data store 40 (FIG. 1). When the beam 34 is turned on, the control electrode of the FET on which the beam impinges receives electrical charge. As a result, when the drive lines 50 for turning on the liquid crystal display are energized, those switches on which the beam has impinged in the preceeding time interval will turn on the associated area A of the liquid crystal display. Areas of the liquid crystal display which do not have a charged FET to the rear, will not be turned on. Thus, contrasting areas of light and dark corresponding to the data stored in the data store 40 are immediately formed on the surface of the liquid crystal display.

When the flash lamp is flashed in appropriate synchronization (i.e. slightly after the energization of the LCD by drive lines 50 to allow for formation of the image on the LCD surface) the formed image can be conveyed through the lens 26 to the photoconductive drum 30. When the drive lines are turned off, the FET's are discharged, preparing the LCD surface for the next beam scanning in association with the next block of binary data.

The invention has been described with reference to a specific embodiment. However the description is illustrative of the invention is not to be construed as limiting the invention. Various modifications and applications may occur to those skilled in the art without departing from the true spirit and scope of the invention as defined by the appended claims.

What is claimed is:

1. Apparatus for recording high resolution binary data at selected positions on an erasable reuseable photoresponsive medium including means for producing character data signals in binary format, a liquid crystal display divided into a plurality of elements, each of said elements being capable of displaying at least a portion of one of said characters, said display being exposed to said photoresponsive medium, an array of semiconductor devices for controlling the state of each of said elements, each of said semiconductor devices comprising a bistable switch having a control electrode responsive to impingement of an electron beam to change the state of the device, means for scanning an electron beam selectively across the control terminals of said devices comprising a cathode ray tube including an electron beam source and means for controlling the horizontal and vertical deflection of said beam across the face of said tube and thereby across the control terminals of said devices, said scanning means including means responsive to said digital data for turning said beam on and off as it is deflected across said terminals, and means for energizing said display, the characters being exposed on the face of said display and recorded on said photoresponsive medium.

2. Apparatus for recording data as claimed in claim 1 further including a fiber optic array for optically coupling the data on said liquid crystal display to said photoresponsive medium.

3. Apparatus for recording data as claimed in claim 2 further comprising a lens for coupling said liquid crystal display to said fiber optics, and a flash lamp synchronized with the means for energizing said display for exposing the characters on said display to said photoresponsive surface.

4. A device as claimed in claim 1 herein each of said semiconductor devices comprises a field effect transistor having a gate electrode responsive to impingement of said scanning electron beam to indicate the character digital data.

5. A device as claimed in claim 1 wherein said cathode ray tune has a face plate, the liquid crystal display being mounted on said face plate, the terminals of said semiconductor devices extending through said face plate to be contacted by said cathode ray tube beam.

* * * * *